US 8,502,460 B2

(12) United States Patent
Hotta (10) Patent No.: US 8,502,460 B2
(45) Date of Patent: Aug. 6, 2013

(54) FLUORESCENT LAMP APPLIANCE, AND LIGHTING CONTROL APPARATUS OF FLUORESCENT LAMP APPLIANCE

(75) Inventor: Shigemi Hotta, Himeji (JP)

(73) Assignee: Nihon Energy Institute Co., Ltd., Himeji-Shi (JP)

( * ) Notice: Subject to any disclaimer, the term of this patent is extended or adjusted under 35 U.S.C. 154(b) by 252 days.

(21) Appl. No.: 13/130,751

(22) PCT Filed: Jul. 3, 2009

(86) PCT No.: PCT/JP2009/062194
§ 371 (c)(1),
(2), (4) Date: May 23, 2011

(87) PCT Pub. No.: WO2010/058620
PCT Pub. Date: May 27, 2010

(65) Prior Publication Data
US 2011/0227491 A1    Sep. 22, 2011

(30) Foreign Application Priority Data

Nov. 21, 2008   (JP) .................................. 2008-297492
Nov. 27, 2008   (JP) .................................. 2008-301805

(51) Int. Cl.
*H05B 37/02*        (2006.01)
(52) U.S. Cl.
USPC ................... 315/185 R; 315/313; 315/200 R; 315/46
(58) Field of Classification Search
USPC ............ 315/46, 49, 73, 185 R, 50, 66, 200 R, 315/219, 224, 237, 242, 278, 279, 282, 291, 315/313
See application file for complete search history.

(56) References Cited

U.S. PATENT DOCUMENTS

| 5,276,385 | A | * | 1/1994 | Itoh et al. ......................... 315/73 |
| 5,729,120 | A | * | 3/1998 | Stich et al. ..................... 323/237 |
| 6,100,651 | A | * | 8/2000 | Ohtsuka ......................... 315/279 |
| 6,181,078 | B1 | * | 1/2001 | Sekiguchi et al. ............. 315/242 |
| 6,242,869 | B1 | * | 6/2001 | Ohtsuka ......................... 315/279 |
| 6,469,447 | B2 | * | 10/2002 | Nakagawa et al. ............. 315/46 |

FOREIGN PATENT DOCUMENTS

| JP | 56-130296 | U | 3/1981 |
| JP | 57-134893 | A | 8/1982 |
| JP | 53-45071 | A | 12/1993 |
| JP | 2000-208238 | A | 7/2000 |
| JP | 2000-208283 | A | 7/2000 |

(Continued)

*Primary Examiner* — Vibol Tan
(74) *Attorney, Agent, or Firm* — Smith Patent Office (57) ABSTRACT

The present Invention provides 2-lamp parallel-type and 2-lamp serial-type fluorescent lamp fixtures, in which 2-lamp lighting and 1-lamp lighting are switchable according to an ON/OFF operation of a power supply switch. In a 2-lamp parallel-type or 2-lamp serial-type fluorescent lamp fixture provided with an inverter-type stabilizer, 2-lamp lighting and 1-lamp lighting are switched by a first control circuit (19, 117) operated according to an ON/OFF operation of a power supply switch (12). In the case of the 2-lamp parallel-type fluorescent lamp fixture, the switching is performed by a switching means (18). In the case of the 2-lamp serial-type fluorescent lamp fixture, the switching is performed by light turning-off circuits (113A, 113B) electrically connecting both terminals of a fluorescent lamp. A second control circuit (20, 131) may be provided to switch the 2-lamp lighting and the 1-lamp lighting of the fluorescent lamps according to an external instruction of a PC or the like.

14 Claims, 8 Drawing Sheets

FOREIGN PATENT DOCUMENTS

| | | |
|---|---|---|
| JP | 2003-142279 A | 5/2003 |
| JP | 2005-183107 A | 7/2005 |
| JP | 2006-058596 U | 3/2006 |
| JP | 2006-058599 U | 3/2006 |
| JP | 2008-010396 A | 1/2008 |

\* cited by examiner

| INPUTS | | | | OUTPUT | | |
|---|---|---|---|---|---|---|
| CLOCK ↑ | DATA1 | RESET1 | SET1 | Q | Q̄ | |
| ⌐ | 0 | 0 | 0 | 0 | 1 | |
| ⌐ | 1 | 0 | 0 | 1 | 0 | |
| ⌐ | X | 0 | 0 | Q | Q̄ | No Change |
| X | X | 1 | 0 | 0 | 1 | |
| X | X | 0 | 1 | 1 | 0 | |
| X | X | 1 | 1 | 1 | 1 | |

X = Dont' Care
↑ = Level Change

FLUORESCENT LAMP APPLIANCE, AND LIGHTING CONTROL APPARATUS OF FLUORESCENT LAMP APPLIANCE

TECHNICAL FIELD

The present invention relates to a fluorescent lamp appliance, and more particularly, to a 2-lamp parallel type and 2-lamp serial type fluorescent lamp appliance in which 2-lamp lighting and 1-lamp lighting can be switched to each other.

BACKGROUND ART

There are many cases where a plurality of 2-lamp fluorescent lamp appliances are installed on the ceilings in offices, stores, factories, and the like to illuminate the whole interior. As such 2-lamp fluorescent lamp appliances, there are a serial-type appliance and a parallel-type appliance, but the serial-type appliances are put into wide use as illumination equipment from the viewpoint of excellent performance and price, and the parallel-type appliances, which can be easily controlled to be turned on and off, are widely employed as signboards such as outdoor billboards (Patent Literature No. 1 & No. 2).

Recently, energy saving is required, regarding illumination, when bright illumination using 2 lamps is not necessary, such as during daylight, one lamp is turned off to save electric power. However, in the serial-type 2-lamp fluorescent lamp appliances, when one lamp is taken off, the other lamp is also turned off.

Thus, in the 2-lamp serial-type fluorescent lamp appliances, a method is proposed in which a dummy tube connected to current-carrying means with a small direct-current resistance is connected between two opposed connection terminals, instead of a general fluorescent lamp, and the one remaining lamp is turned on (Patent Literature No. 3, No. 4 & No. 5). In these 2-lamp serial-type fluorescent lamp appliances, the dummy tube is used, and thus the dummy tube has to be replaced with a general fluorescent lamp when bright illumination is needed, such as at nighttime, which requires a complicated operation.

A fluorescent lamp appliance is proposed in which the number of ON/OFF operation times of a power supply switch provided on the wall is counted, and an operation of a bimetal-type starter of a fluorescent lamp is permitted or prevented according to the number of operation times (Patent Literature No. 6).

Meanwhile, the inventor of the present invention developed a fluorescent lamp appliance and applied for a patent, in which a current-carrying circuit of one fluorescent lamp in a 2-lamp parallel-type fluorescent lamp is provided with switching means and the switching means is closed or opened by a control circuit including a D-type flip-flop circuit operating according to the ON/OFF operation of a power supply switch (Patent Literature No. 7). In the fluorescent lamp appliances, it is possible to turn on only one lamp as necessary by the operation of the power supply switch, it is possible to save electric power by turning off one lamp in the daytime or the like, and it is possible to secure bright illumination by turning on two lamps at nighttime or the like.

CITATION LIST

Patent Literature

PLT 1 Japanese Utility Model Registration Application Publication No. 06-58596

PLT 2 Japanese Utility Model Registration Application Publication No. 06-58599

PLT 3 Japanese Patent Application Publication No. 53-45071

PLT 4 Japanese Utility Model Registration Application Publication No. 56-130296

PLT 5 Japanese Patent Application Publication No. 2000-208238

PLT 6 Japanese Patent Application Publication No. 2003-142279

PLT 7 Japanese Patent Application Publication No. 2008-10396

SUMMARY OF INVENTION

Technical Problem

However, in the method disclosed in the document of PLT 7, when a plurality of fluorescent lamp appliances are arranged to constitute an illumination system, all illumination lamps become 1-lamp lighting or 2-lamp lighting, for example, it is difficult to exert fine control such as 2-lamp lighting at certain parts and 1-lamp lighting at parts where brightness is not necessary.

In the method disclosed in the document of PLT 7, a current-carrying circuit of one fluorescent lamp in the 2-lamp parallel-type fluorescent lamp appliance is opened or closed by switching means, and thus the method cannot be applied to the 2-lamp serial-type fluorescent lamp appliance.

A first object of the invention is to provide a 2-lamp parallel-type fluorescent lamp appliance in which 2-lamp lighting and 1-lamp lighting can be switched to each other as necessary without performing the ON/OFF operation of a power supply switch.

A second object of the invention is to provide a 2-lamp serial-type fluorescent lamp appliance in which 2-lamp lighting and 1-lamp lighting can be switched to each other by the ON/OFF operation of a power supply switch.

A third object of the invention is to provide a 2-lamp serial-type fluorescent lamp appliance in which 2-lamp lighting and 1-lamp lighting can be switched to each other as necessary without performing the ON/OFF operation of a power supply switch.

Solution of Problem

According to an aspect of the present invention, there is provided a 2-lamp parallel-type fluorescent lamp appliance in which two current-carrying circuits are connected to output terminals of a stabilizer using a commercial power supply as a power supply in series to the output terminals thereof and are connected in parallel to each other, fluorescent lamps are connected to each of the two current-carrying circuits, the stabilizer is electrically connected to the current-carrying circuits by an ON operation of a power supply switch, and two fluorescent lamps are turned on, the fluorescent lamp appliance including a fluorescent lamp switching means that is provided at one of the two current-carrying circuits and connects or disconnects the one current-carrying circuit, a first control circuit that operates according to the ON/OFF operation of the power supply switch, is electrically connected by the ON operation of the power supply switch within a predetermined time after the power supply switch is turned on and then is turned off, and controls the fluorescent lamp switching means to disconnect the current-carrying circuit, and a second control circuit that opens a normally closed-type relay contact point when a relay coil thereof is electrically connected by receiving an external instruction signal, in which the normally closed-type relay contact point is connected to a power supply input terminal of the first control circuit, and the normally closed-type relay contact point disconnects the one current-carrying circuit by controlling the first control circuit when the relay contact point is connected within a predetermined time after it is disconnected at the time of the ON operation of the power supply switch.

One of characteristics of the present invention is that the current-carrying circuit of one fluorescent lamp in the 2-lamp parallel-type fluorescent lamp appliance is provided with the fluorescent lamp switching means, and the fluorescent lamp switching means is closed or opened by the first control circuit corresponding to the ON/OFF operation of the power supply switch.

According to such a configuration, one lamp can be turned off and the other one lamp can be turned on by itself when bright illumination is not necessary such as in the daytime. Accordingly, it is possible to save electric power, and thus it is possible to save energy as a whole by cutting power consumption. In addition, when bright illumination is necessary, such as at nighttime, it is possible to perform illumination at the necessary brightness by turning on two lamps.

When only one fluorescent lamp is turned on to save electric power, the illumination becomes dim. Thus, it is preferable to provide a reflection plate on the back of the fluorescent lamps to increase the intensity of illumination. For example, a reflection plate according to the study made by the inventor of the present invention can be used (Japanese Patent Application Laid-Open No. 2000-106015).

When the fluorescent lamp switching means operates according to the ON/OFF operation of the power supply switch, 2-lamp lighting may be performed by the first ON operation of the power supply switch and 1-lamp lighting may be performed by the next ON operation. However, when 2-lamp lighting is performed, the light is turned off, and then the power supply switch is operated to be turned on, the operation of the power supply switch becomes usually the second ON operation to be a 1-lamp lighting state, and thus it may be misunderstood that the fluorescent lamp is damaged, that is, blown out.

When it is configured that the operation of the power supply switch is determined as the second ON operation only when the next ON operation of the power supply switch occurs within a predetermined time after the 2-lamp lighting is performed and is then turned-off, the two lamps are turned on when the ON operation of the power supply switch is performed after a predetermined time elapses after the turning-off, thereby solving the above-described misunderstanding.

It is preferable if the fluorescent lamp switching means and the first control circuit can perform the above-described lighting control. That is, a normally closed-type relay contact point is employed as the fluorescent lamp switching means, and the first control circuit may be configured so that the first control circuit is not electrically connected to the relay coil and maintains the relay contact point connected at the time of the first ON operation of the power supply switch, and the first control circuit is electrically connected to the relay coil at the next ON operation of the power supply switch during the time until a discharge time of the charge/discharge circuit elapses after the power supply switch is turned off, thereby cutting the relay contact point.

Specifically, the first control circuit may include a switch means that is turned on or off according to the ON/OFF operation of the power supply switch, a clock signal generating circuit that generates a clock signal when the switch means is turned on, a D-type flip-flop circuit that inverts an output signal state thereof by an input of a clock signal, a charge/discharge circuit that is charged by applying a circuit voltage, and maintains an operation state of the D-type flip-flop circuit during discharge after the switch means is turned off, and a switching circuit that turns on or off the relay contact point of the fluorescent lamp switching means according to the output signal of the D-type flip-flop circuit.

A yoke-type transformer may be used as the stabilizer, but in order to save electric power it is preferable to use an inverter-type stabilizer that outputs, as an input, a high-frequency voltage using a direct current voltage using a commercial power supply as a power supply circuit.

Another characteristic of the present invention is that the normally closed-type relay contact point is connected to the power supply input terminal of the first control circuit, and the normally closed-type relay contact point is disconnected when the second control circuit receives an external instruction signal from, for example, a PC or the like.

According to the present invention, the 2-lamp lighting and the 1-lamp lighting can be switched as necessary without performing the ON/OFF operation of the power supply switch, and the fluorescent lamp appliance can perform the 2-lamp or 1-lamp lighting at a desired location or a desired time. Therefore, it is possible to exert fine control of the illumination system.

The fluorescent lamp appliance according to the present invention, in which two current-carrying circuits are connected to output terminals of a stabilizer using a commercial power supply as a power supply in series to the output terminals thereof and are connected in series to each other, fluorescent lamps are connected to each of the two current-carrying circuits, the stabilizer is electrically connected to the current-carrying circuits by an ON/OFF operation of a power supply switch, and two fluorescent lamps are turned on, wherein the fluorescent lamp appliance includes light turning-off circuits and a first control circuit, the light turning-off circuits are provided with an inductor having a selected resistance connected in series, and turn off one fluorescent lamp by electrically connecting both terminals of one fluorescent lamp of the two fluorescent lamps, and the first control circuit operates according to the ON/OFF operation of the power supply switch, and electrically connects the light turning-off circuits when the power supply switch is turned on to flow electric current within a predetermined time after the power supply switch is turned on and then is turned off.

One of characteristics of the invention is that both terminals of one fluorescent lamp in the 2-lamp serial-type fluorescent lamp appliance are electrically connected to each other by a light turning-off circuit including an inductor, thereby electrically connecting between both terminals of the one fluorescent lamp with a predetermined resistance.

Accordingly, in the 2-lamp serial-type fluorescent lamp appliance, one fluorescent lamp can be turned on, the other fluorescent lamp can be turned off, and thus the 2-lamp lighting and the 1-lamp lighting can be switched by the ON/OFF operation of the power supply switch.

The first control circuit may be configured as follows. That is, the first control circuit may include a relay contact point, a clock generating circuit, a D-type flip-flop circuit, a charge/discharge circuit and a switching circuit, the relay contact point electrically connects the light turning-off circuits by electrical connection to a relay coil, the clock generating circuit generates a clock signal when the power supply switch is turned on, the D-type flip-flop circuit inverts an output signal state by an input of the clock signal, the charge/discharge circuit that is charged by applying a circuit voltage, and maintains an operation state of the D-type flip-flop circuit during discharge after the power supply switch is turned off, and the switching circuit allows current to flow in the relay coil according to an output signal of the D-type flip-flop circuit.

In the case of controlling the 2-lamp lighting and the 1-lamp lighting of the fluorescent lamps according to the external instruction signal, it is possible to cope with the case by further including a second control circuit, wherein the second control circuit opens a normally closed-type relay contact point that is connected to a power supply input terminal of the first control circuit, and electrically connects the light turning-off circuits by controlling the switching circuit when a relay coil is electrically connected by receiving an external instruction signal and the relay contact point is closed within a predetermined time after it is opened at the time of the ON operation of the power supply switch.

However, the fluorescent lamp appliances have variable electrical characteristics according to the manufacturers. Accordingly, even when the light turning-off circuit having the inductor is simply connected to fluorescent lamp appliances having different characteristics, there is a case where one lamp cannot be turned on with the other lamp being turned off. Therefore, it is necessary to design each characteristic of the light turning-off circuit for each of the fluorescent lamp appliances having different characteristics, thereby not only complicating a manufacturing process but also incurring high costs.

Another characteristic of the invention is that the light turning-off circuit is provided with connection terminals in which an inductor is exchangeable, the inductor have a resistance that is selected according to an output characteristic of a stabilizer of the fluorescent lamp appliance and is connected to the light turning-off circuit, and both terminals of one fluorescent lamp are electrically connected to each other with a predetermined resistance.

Accordingly, for the fluorescent lamp appliances having different characteristics, it is possible to turn on one fluorescent lamp and to turn off the other fluorescent lamp by selecting the inductor, and thus it is possible to reliably switch the 2-lamp lighting and the 1-lamp lighting by the ON/OFF operation of the power supply switch.

As a result, in most commercially available 2-lamp serial-type fluorescent lamp appliances, one lamp can be turned off and the other lamp can be turned on when bright illumination is not necessary, such as in the daytime. Accordingly, it is possible to save electric power, and thus it is possible to save energy as a whole by cutting power consumption. When bright illumination is required, such as at nighttime, it is possible to perform illumination at the necessary brightness by turning on two lamps. In addition, it is conceivable to use a resistor instead of the inductor, but the resistor generates heat by electric connection.

According to an experiment of the inventor of the invention, in the case of the fluorescent lamp appliances with different characteristics, one lamp can be turned on, but the power consumption of the power supply or the amount of current drastically increases. Thus, there is a case where the temperature of the fluorescent lamp or the stabilizer rises drastically, and thus durability may deteriorate. However, in the present invention, the inductor having an appropriate resistance is selected and used, and thus it is possible to suppress the temperature of the fluorescent lamp or the inverter-type stabilizer and the fluorescent lamp from rising during lighting. As a result, it was confirmed that the increase of the power consumption of the power supply or the amount of current could be suppressed.

That is, it is preferable to further provide the connection terminals of the inductor to serially and exchangeably connect the inductor to the light turning-off circuits.

A signal output from a control device operated by a program, for example, a PC can be employed as the external instruction signal.

When only one fluorescent lamp is turned on to save electric power, the illumination becomes dim. Thus, it is preferable to provide a reflection plate on the back of the fluorescent lamps to increase the intensity of illumination. For example, a reflection plate made by the inventor of the present invention may be used (Japanese Patent Application Laid-Open No. 2000-106015).

The 2-lamp lighting and the 1-lamp lighting are switched according to the ON/OFF operation of the power supply switch, 2-lamp lighting may be performed by the first ON operation of the power supply switch and 1-lamp lighting may be performed by the next ON operation. In the case of switching the 2-lamp lighting and the 1-lamp lighting solely according to the ON/OFF operation of the power supply switch, when 2-lamp lighting is performed, the light is turned off, and then the power supply switch is operated to be turned on, the operation of the power supply switch becomes the second ON operation to be a 1-lamp lighting state, and thus it may be misunderstood that the fluorescent lamp is damaged, that is, blown out.

When it is configured that the operation of the power supply switch is determined as the second ON operation only at the time of the next ON operation of the power supply switch within a predetermined time after the 2-lamp lighting is performed and then the turning-off is performed, the two lamps are turned on when the ON operation of the power supply switch is performed after a predetermined time elapses after the turning-off, thereby solving the above-described misunderstanding.

Thus, in the present invention, the control circuit is formed of a D-type flip-flop circuit and a charge/discharge circuit.

A large number of inductors with different resistances may be prepared and selected to be connected to the connection terminals, which requires a complicated operation. Thus, it is preferable that pairs of connection terminals are connected in series and that a plurality of inductors or a conductor and an inductor are connected to the pairs of connection terminals to control resistance.

A fluorescent lamp to be turned off may be determined in advance, but it is preferable that the fluorescent lamp is selectable as necessary. Thus, it is preferable to further include two light turning-off circuits and a switching switch, wherein the light turning-off circuits turn off fluorescent lamps by electrically connecting both terminals of each of the two fluorescent lamps, and the switching switch switches contact between one light turning-off circuit of the two light turning-off circuits and the connection terminals.

According to the invention, there is provided alighting control apparatus of a fluorescent lamp appliance, the apparatus including a stabilizer, a first control circuit and a second control circuit provided in the same case or mounted on a same board, the first control circuit is provided in a 2-lamp parallel-type fluorescent lamp appliance in which two current-carrying circuits are connected to output terminals of the stabilizer using a commercial power supply as a power supply in series to the output terminals and are connected in parallel to each other, fluorescent lamps are connected to each of the two current-carrying circuits, the stabilizer is electrically connected to the current-carrying circuits by an ON/OFF operation of a power supply switch thereby two fluorescent lamps are turned on, wherein the first control circuit operates according to the ON/OFF operation of the power supply switch, is electrically connected by the ON operation of the power supply switch within a predetermined time after the power supply switch is turned on and then is turned off, and controls the fluorescent lamp switching means to disconnect the current-carrying circuit, and the second control circuit opens a normally closed-type relay contact point which is connected to a power supply input of the first control circuit and is electrically connected to a relay coil by receiving an external instruction signal, and disconnects the one current-carrying circuit by controlling the first control circuit when the relay contact point is closed within a predetermined time after it is opened at the time of the ON operation of the power supply switch.

According to the invention, there is provided a lighting control apparatus used in a 2-lamp parallel-type fluorescent lamp appliance in which two current-carrying circuits are connected to output terminals of a stabilizer using a commercial power supply as a power supply in series to the output terminals and are connected in parallel to each other, fluorescent lamps are connected to each of the two current-carrying circuits, the stabilizer is electrically connected to the current-carrying circuits by an ON/OFF operation of a power supply switch thereby two fluorescent lamps are turned on, the apparatus including a first control circuit and a second control circuit provided in a same case or mounted on a same board, the first control circuit operates according to the ON/OFF operation of the power supply switch, is electrically connected by the ON operation of the power supply switch within a predetermined time after the power supply switch is turned on and then is turned off, and controls the fluorescent lamp switching means to disconnect the current-carrying circuit, and the second control circuit opens a normally closed-type relay contact point which is connected to a power supply input terminal of the first control circuit and is electrically connected to a relay coil by receiving an external instruction signal, and disconnects the one current-carrying circuit by controlling the first control circuit when the relay contact point is closed within a predetermined time after it is opened at the time of the ON operation of the power supply switch.

According to the invention, there is provided a lighting control apparatus of a fluorescent lamp appliance, the apparatus including a stabilizer and a first control circuit provided in a same case or mounted on a same board, the stabilizer is provided in a 2-lamp serial-type fluorescent lamp appliance in which two current-carrying circuits are connected to output terminals of the stabilizer using a commercial power supply as a power supply in series to the output terminals and are connected in series to each other, fluorescent lamps are connected to each of the two current-carrying circuits, the stabilizer is electrically connected to the current-carrying circuits by an ON/OFF operation of a power supply switch thereby two fluorescent lamps are turned on, the first control circuit operates according to the ON/OFF operation of the power supply switch and electrically connects light turning-off circuits when the power supply switch is turned on to flow electric current within a predetermined time after the power supply switch is turned on and then is turned off, and turns off one fluorescent lamp by electrically connecting both terminals of one fluorescent lamp of the two fluorescent lamps, and the case or the board is provided with connection terminals, and an inductor having a resistance selected according to an output characteristic of the stabilizer and constituting the light turning-off circuits is exchangeably connected to the connection terminals.

According to the invention, there is provided a lighting control apparatus used in a 2-lamp serial-type fluorescent lamp appliance in which two current-carrying circuits are connected to output terminals of a stabilizer using a commercial power supply as a power supply in series to the output terminals and are connected in series to each other, fluorescent lamps are connected to each of the two current-carrying circuits, the stabilizer is electrically connected to the current-carrying circuits by an ON/OFF operation of a power supply switch, and two fluorescent lamps are turned on, wherein the apparatus including a first control circuit provided in a case or mounted on a board, the first control circuit operates according to the ON/OFF operation of the power supply switch, electrically connects light turning-off circuits when the power supply switch is turned on to flow electric current within a predetermined time after the power supply switch is turned on and then is turned off, and turns off one fluorescent lamp by electrically connecting both terminals of one fluorescent lamp of the two fluorescent lamps, the case or the board is provided with connection terminals, and an inductor having a resistance selected according to an output characteristic of the stabilizer and constituting the light turning-off circuits is exchangeably connected to the connection terminals.

In this case, the lighting control apparatus of the fluorescent lamp appliance may further include a second control circuit that opens a normally closed relay contact point which is connected to a power supply input terminal of the first control circuit and is electrically connected a relay coil by receiving an external instruction signal, and electrically connects the light turning-off circuits by controlling the first control circuit when the relay contact point is closed within a predetermined time after it is opened at the time of the ON operation of the power supply switch, and the second control circuit is provided in the case or is mounted on the board.

DESCRIPTION OF EMBODIMENTS

Hereinafter, the invention will be described in detail with reference to specific examples shown in the drawings. FIG. 1 to FIG. 5 show preferred embodiments of a fluorescent lamp appliance according to the invention. In the drawings, a power supply circuit 10 is operated to be turned on or off by a power supply switch 12, to which an alternating current voltage of a commercial power supply 11 is input, and from which a direct current voltage is output. The output voltage of the power supply circuit 10 is input to an inverter-type stabilizer 13, and a predetermined high-frequency voltage is output.

Figure 2:
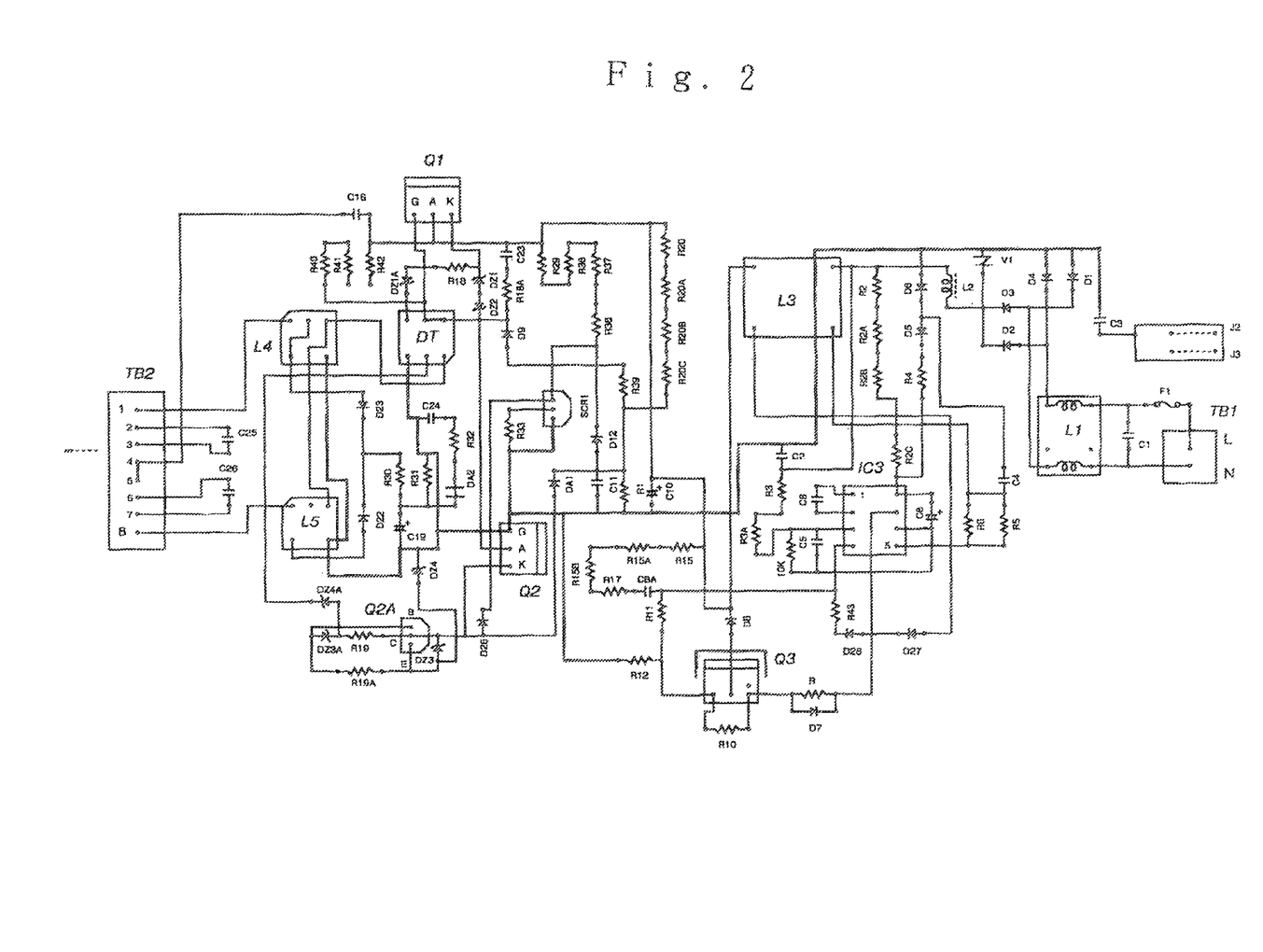
FIG. 2 is a diagram illustrating an example of a circuit configuration of a stabilizer in the embodiment.

Two current-carrying circuits 14A and 14B are connected to output terminals of the inverter-type stabilizer 13 in series to the output terminals and are connected in parallel to each other. The current-carrying circuits 14A and 14B are connected to choke coils 15A and 15B and fluorescent lamps 16A and 16B, respectively. An example of a circuit configuration of the inverter-type stabilizer 13 is shown in FIG. 2, but the example is not necessarily limited to this circuit configuration.

Figure 1:
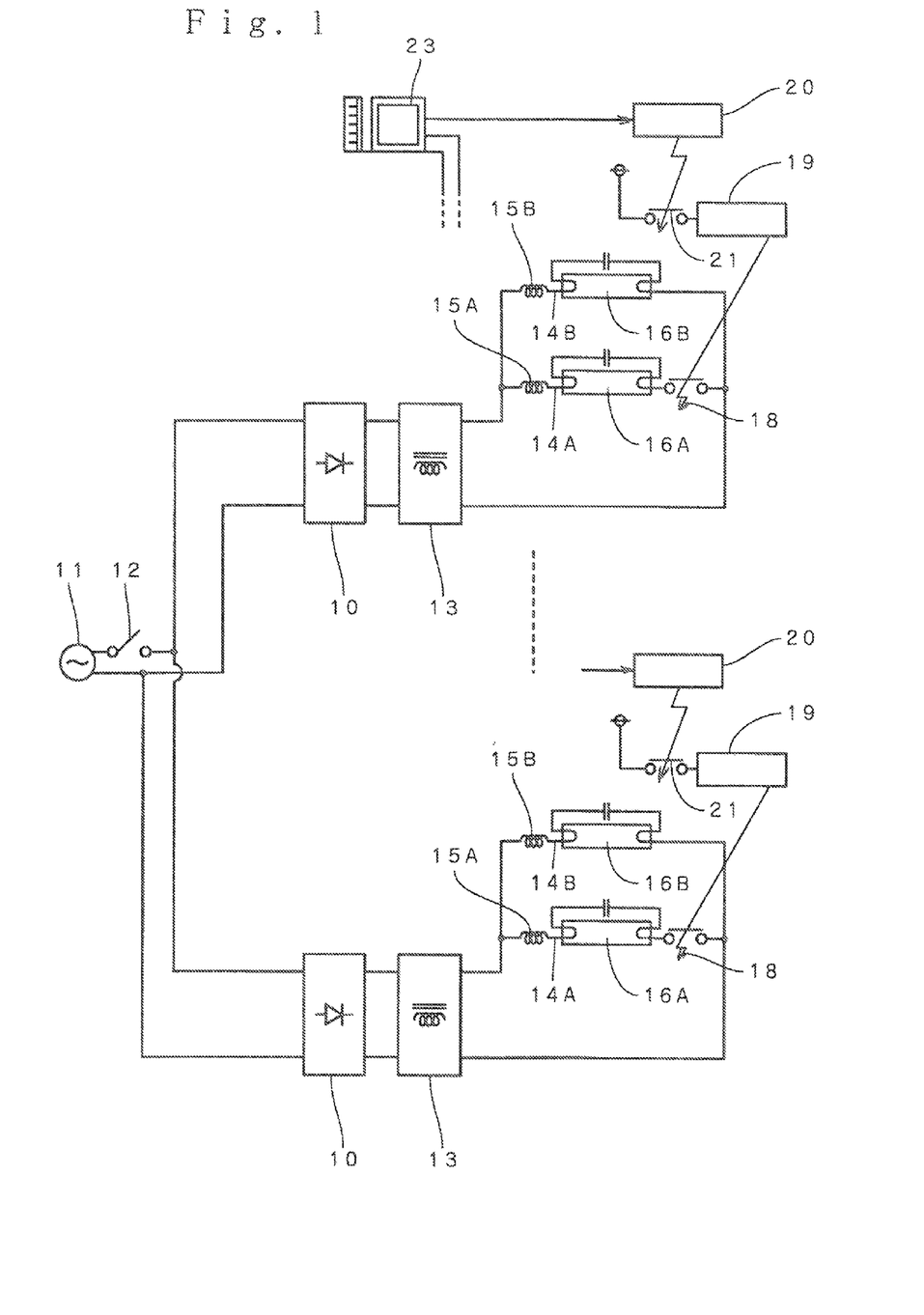
FIG. 1 is a diagram illustrating an example of a circuit configuration in a preferred embodiment of a fluorescent lamp appliance according to the invention.

One current-carrying circuit 14A is connected to a normally closed-type relay contact point (fluorescent lamp switching means) 18, and the relay contact point 18 is opened or closed (connected or disconnected) by a first control circuit 19 operated according to the ON/OFF operation of the power supply switch 12.

Figure 3:
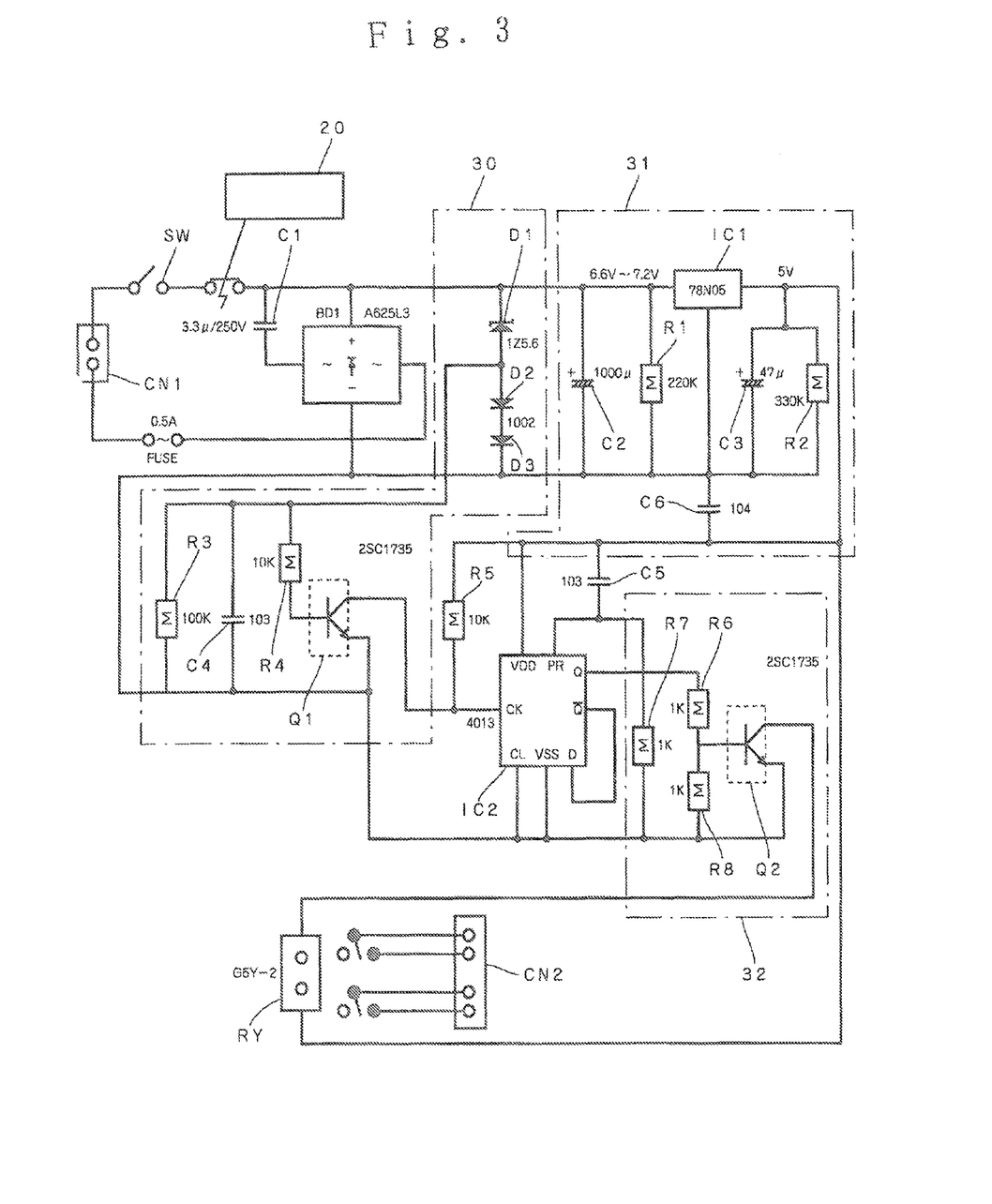
FIG. 3 is a diagram illustrating an example of the first control circuit in the embodiment.
Figure 5:
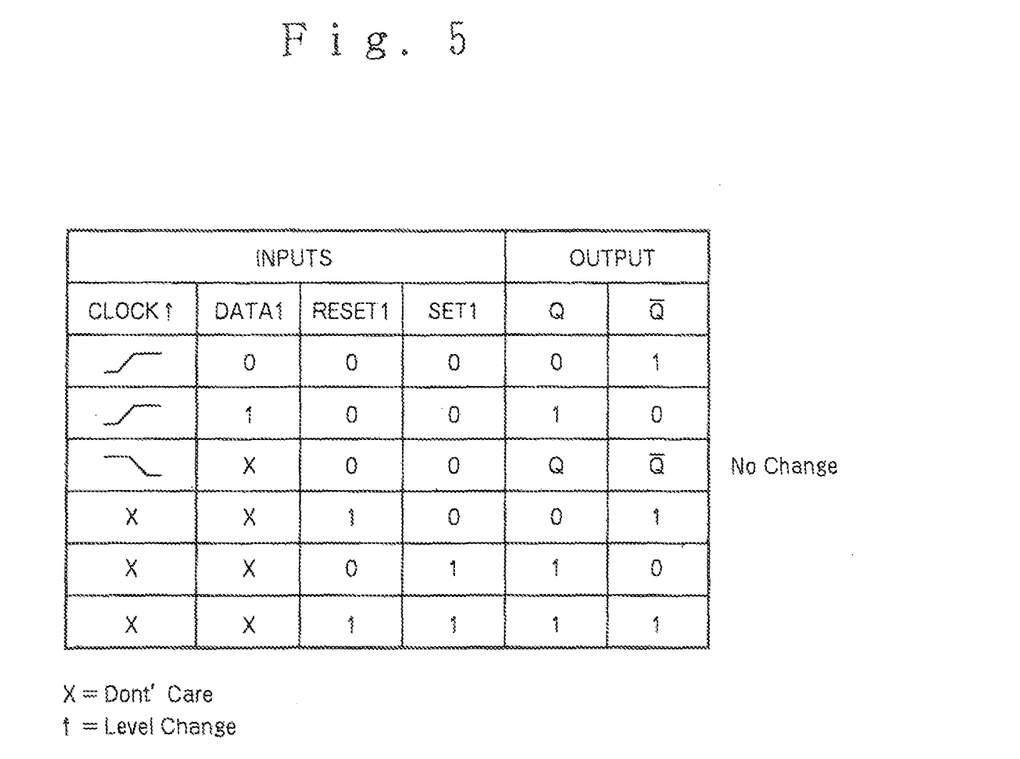
FIG. 5 is a diagram illustrating a truth table of an operation of a D-type flip-flop circuit in the embodiment.

The first control circuit 19 has, for example, a circuit configuration shown in FIG. 3. Basically, the first control circuit 19 may be configured by a D-type flip-flop circuit (hereinafter, a flip-flop circuit is referred to simply as a FF circuit). A truth table of operations of the D-type FF circuit is shown in FIG. 5.

That is, the first control circuit 19 includes a switch (switch means) SW that is turned on or off according to the ON/OFF operation of the power supply switch 12, a clock generating circuit 30 that generates a clock signal when the switch SW is turned on, a D-type FF circuit IC2 that inverts an output signal by the input of the clock signal, a charge/discharge circuit 31 that is charged by applying a circuit voltage and maintains an operation state of the D-type FF circuit IC2 during discharge after the switch SW is turned off, and a switching circuit 32 that turns on or off a relay coil according to the output signal of the D-type FF circuit IC2.

When the power supply switch 12 is turned on for the first time, the switch SW is turned on and a voltage taken from a contact point between a Zener diode D1 and diodes D2 and D3 is applied to a base of a transistor Q1. A voltage ratio of the Zener diode D1 and the diodes D2 and D3 is set so that a base voltage of the transistor Q1 is an operation voltage ±1.6 V. In addition, it is set so that a voltage of 5.6 V or higher is applied to the Zener diode D1 by dropping an alternating current voltage from 100 V by the capacitor C1.

When the power supply switch 12 is turned on for the first time, the switch SW is turned on, the voltage is applied to the base of the transistor Q1, the transistor Q1 is turned on, and a clock signal is transmitted from a collector of the transistor Q1 to a clock terminal CK of the FF circuit IC2.

At this time, an inverse terminal −Q of the D-type FF circuit IC2 is "H", and a data terminal D is "H". Accordingly, an output terminal Q of the D-type FF circuit IC2 maintains a "L" state until a signal of the clock terminal CK reaches a falling edge.

As for the clock signal applied from the collector of the transistor Q1 to the clock terminal CK of the D-type FF circuit IC2, a characteristic or a time can be freely set by varying a time constant determined by a resistor R3, a capacitor C4, and a resistor R4.

When the output terminal Q of the D-type FF circuit IC2 is kept in the "L" state, a base voltage of the transistor Q2 is 0, the transistor Q2 does not operate, a relay RY does not operate, the relay contact point 18 is maintained in the ON state, and both of the fluorescent lamps 16A and 16B are turned on.

In the D-type FF circuit IC2, data of a data input D is read into the D-type FF circuit IC2 at the time of the falling edge of the clock signal, and the data is output to the output terminal Q at the time of the rising edge of the next clock signal. When input signals of a set terminal PR and a reset terminal CL of the D-type FF circuit IC2 are set to "H", the setting and resetting of the D-type FF circuit IC2 can be performed independently from the input of the clock signal. Accordingly, the reset terminal CL is connected to the ground GND.

When the switch SW is turned on, capacitors C2 and C3 are charged. After the switch SW is turned off, the capacitors C2 and C3 are discharged. The FF circuit IC2 maintains the operation state until the discharge continues down to a predetermined voltage or lower. The discharge time is determined by the capacitors C2 and C3 and the resistors R1 and R2.

When the power supply switch is turned on again before the discharge of the capacitors C2 and C3 is completed, the clock signal output from the collector of the transistor Q1 is applied to the clock terminal CK of the D-type FF circuit IC2. The output terminal Q of the D-type FF circuit IC2 becomes "H", and the inverse terminal −Q becomes "L", which maintains the states.

In this case, the base voltage of the transistor Q2 becomes the operation voltage, the transistor Q2 operates, electric current flows into the relay RY, and the relay contact point 18 is turned off. Accordingly, the fluorescent lamp 16A is not turned on, and only the fluorescent lamp 16B is turned on. 5 V supplied from an IC1 is used as the power supply of the relay RY.

When the power supply switch is turned off and the switch SW is turned off to discharge the capacitors C2 and C3 down to a voltage level equal to or lower than a predetermined voltage, the D-type FF circuit IC2 is initialized and the relay RY enters a non-operation state. Accordingly, the relay contact point 18 returns to the normally closed state, and the fluorescent lamps 16A and 16B return to the state where they can be turned on.

As described above, when the ON/OFF operation of the power supply switch 12 is repeated, the D-type FF circuit IC2 is also flip-flopped. Accordingly, it is possible to control and maintain the relay RY, and thus the 2-lamp lighting and the 1-lamp lighting can be switched and controlled.

The power supply input of the first control circuit 19 is connected to the normally closed-type relay contact point 21, and the normally closed-type relay contact point 21 is opened or closed by a second control circuit 20. As shown in FIG. 5, the second control circuit 20 includes, for example, a switching element 23 and a relay coil 22. When an external instruction signal is input from a PC 23, the switching element 22 is turned on and the relay contact point 21 is opened.

Figure 4:
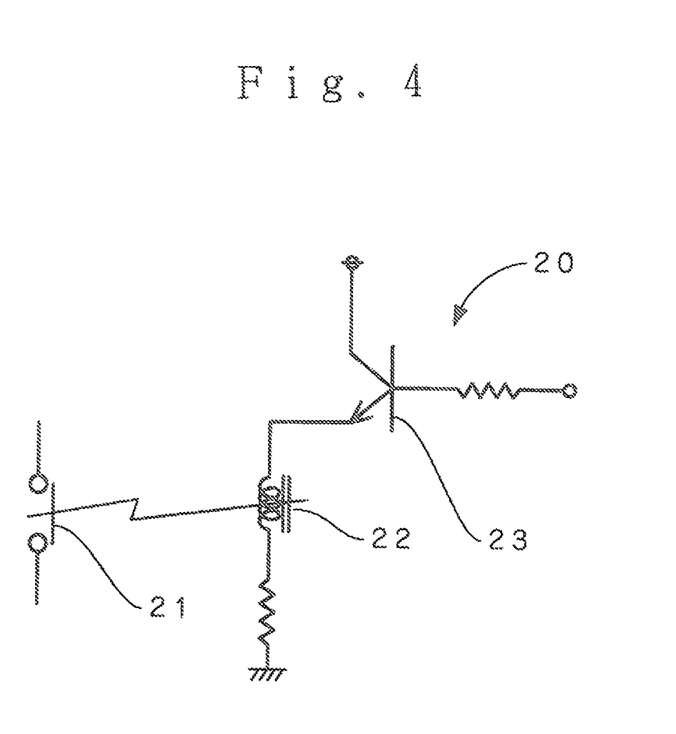
FIG. 4 is a diagram illustrating a main part of an example of the second control circuit in the embodiment.

When a time schedule of the 2-lamp lighting or the 1-lamp lighting is set by the PC (control device) 23 or parts for which the 2-lamp lighting is necessary and unnecessary are set, the external instruction signal is output from the PC 23 toward the second control circuit 20 of the corresponding fluorescent lamp appliance.

The relay contact point 21 is opened during the turning-on of the power supply switch 12, the electrical connection is cut off, which results in the same state as the state where the power supply switch 12 is operated to be turned on and then turned off. Thus, the relay contact point 21 is closed by the signal output from the PC 23 within a predetermined time after the relay contact point 21 is opened, which results in the same state as the state where the power supply switch 12 is operated to be turned on and then turned off. Accordingly, the fluorescent lamp appliance enters the 1-lamp lighting state.

As described above, the 2-lamp lighting and the 1-lamp lighting of the fluorescent lamp appliance can be switched by the PC 23, it is possible to perform the 2-lamp lighting at a desired place and a desired time and to exert fine control of switching to the 1-lamp lighting at other places or times.

In the example, the first and second control circuits 19 and 20 are built in the case in which the inverter-type stabilizer 13 is built. However, the first and second control circuits 19 and 20 may be built in the case or mounted on a board, which may be mounted on a case of the fluorescent lamp appliance.

Figure 6:
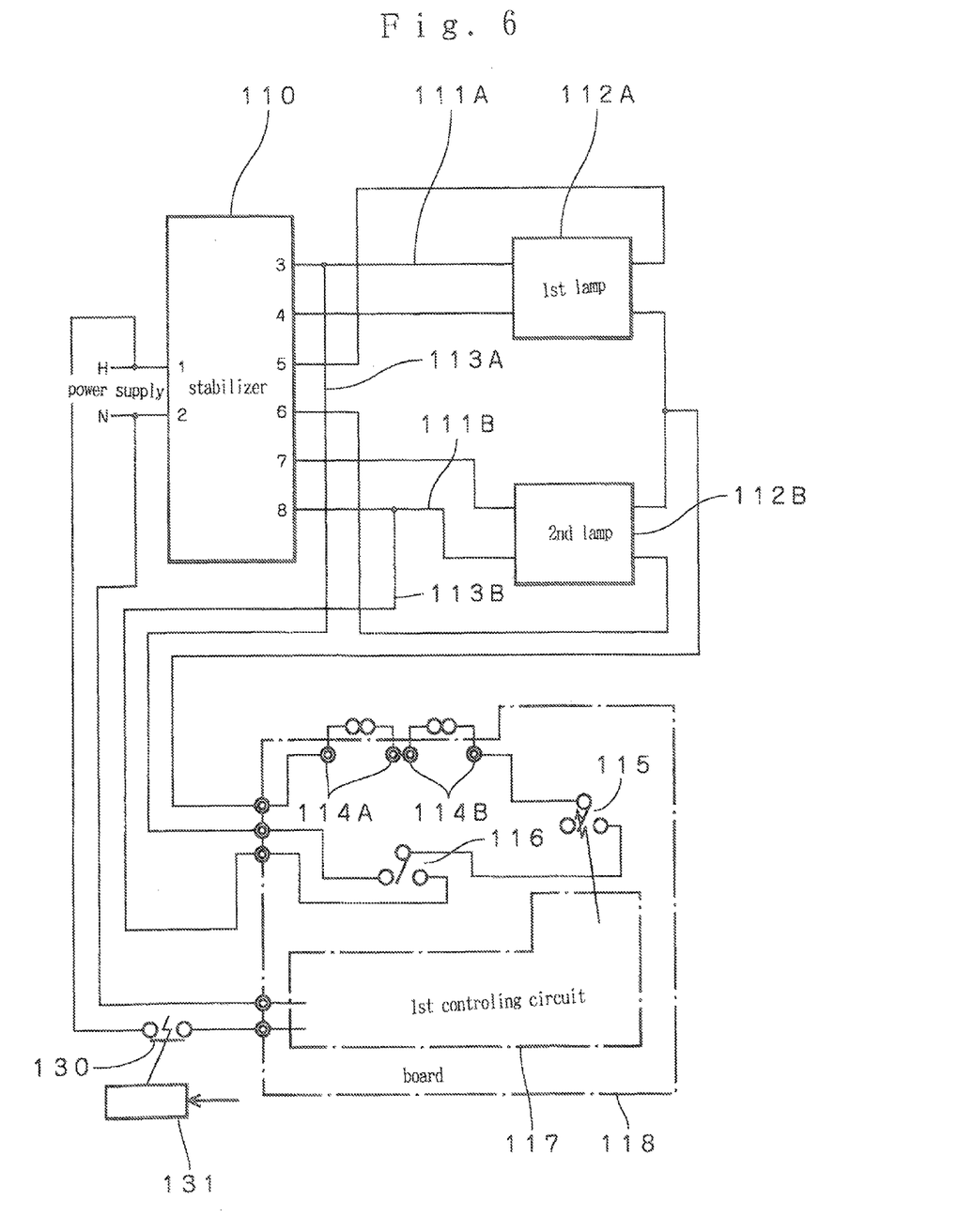
FIG. 6 is a diagram illustrating an example of a configuration of a circuit block in a second embodiment.
Figure 7:
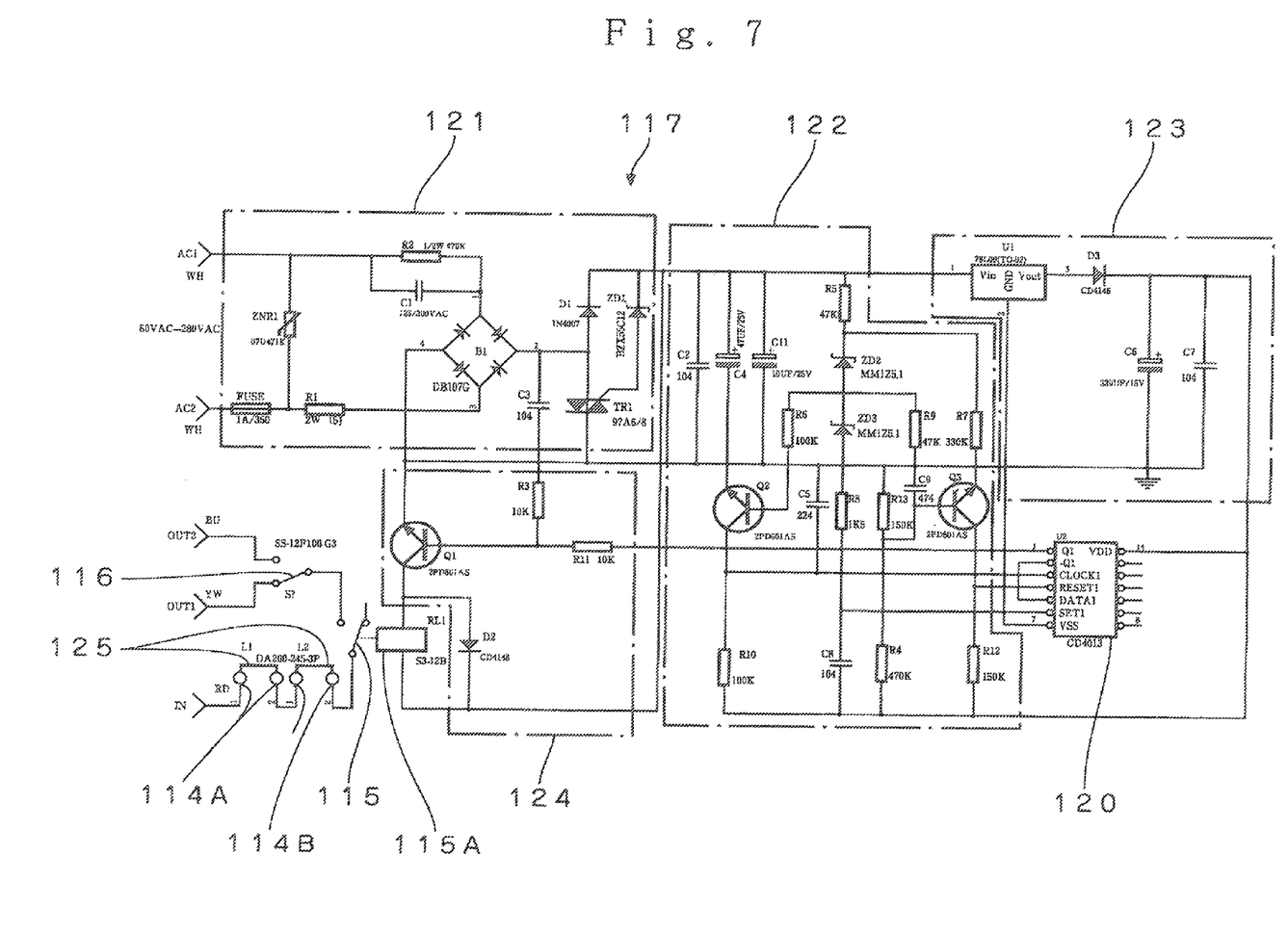
FIG. 7 is a diagram illustrating an example of the first control circuit in the embodiment.
Figure 8:
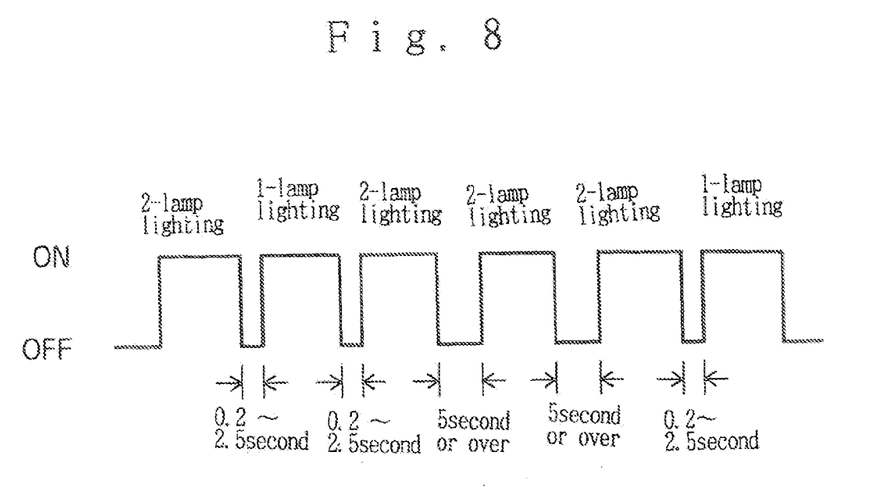
FIG. 8 is a diagram for explaining operations of 2-lamp lighting and 1-lamp lighting in the embodiment.

FIG. 6 to FIG. 8 show a second embodiment. In the figures, a power supply circuit is provided with a power supply switch (not shown), and uses an alternating current voltage of the commercial power supply, as an input. The output voltages H and N of the power supply circuit are input to the known inverter-type stabilizer 110, thereby outputting a high-frequency voltage.

Two current-carrying circuits 111A and 111B are connected to the output terminals of the inverter-type stabilizer 110 in series to the output terminals and in series to each other, and the two current-carrying circuits 111A and 111B are connected to the fluorescent lamps 112A and 112B. The current-carrying circuits 111A and 111B and the fluorescent lamps 112A and 112B have known configurations, and detailed description thereof is omitted.

Light turning-off circuits 113A and 113B are connected to the two fluorescent lamps 112A and 112B to electrically connect both terminals thereof, and two pairs of connection terminals 114A and 114B and the relay contact points 115 are serially connected to the two light turning-off circuits 113A and 113B through the switching switch 116.

Electrical connection of a relay coil 115A of the relay contact point 115 is controlled by the first control circuit 117 operated according to the ON/OFF operation of the power supply switch, and two pairs of connection terminals 114A and 114B, the relay contact point 115, the relay coil 115A, the switching switch 116, and the first control circuit 117 are mounted on a board 118 formed of a substrate for a semiconductor. The board 118 is mounted on a case of the fluorescent lamp appliance by screws, clips, double-sided adhesive tapes, magnets, or the like, and the connection terminals 114A and 114B are connected to the inductor 125 or the conductor 126 and the inductor 125.

The first control circuit 117 has a circuit configuration, for example, as shown in FIG. 7. Basically, the first control circuit 117 may be configured by a D-type flip-flop circuit (hereinafter, referred to simply as a FF circuit) 120. A truth table of operations of the D-type FF circuit 120 is shown in FIG. 5.

The first control circuit 117 includes a rectifier circuit 121 that rectifies the output voltage of the power supply circuit as an input, a clock generating circuit 122 that generates a clock signal when the power supply is turned on, the D-type FF circuit 120 that inverts the state of output signal by the input of the clock signal, a charge/discharge circuit 123 that is charged by applying a voltage and maintains the operation state of the D-type FF circuit 120 during discharge after the power supply is turned off, and a switching circuit 124 that turns the relay coil 115A on or off according to the output signal of the D-type FF circuit 120.

A triac TR1 is provided to perform the voltage control so as to operate with a power supply voltage of AC 80 V to 280 V. In order to protect the circuit from lightning strikes, a Zener diode ZD1 is provided and a fuse FUSE is cut off by an overcurrent.

When the power supply switch is turned on for the first time, a voltage taken from the contact point between the Zener diodes ZD2 and ZD3 is reduced by the resistor R6 and is applied to the base of the transistor Q2. The resistance of the resistor R6 is set so that the base voltage of the transistor Q2 becomes the operation voltage.

When the power supply switch is turned on for the first time, the transistor Q2 is turned on. The clock signal output from the collector of the transistor Q2 is transmitted to the clock terminal CLOCK 1 of the D-type FF circuit 120.

At this time, the inverse terminal –Q1 of the D-type FF circuit 120 is "H" and the data terminal DATA 1 is "H". Accordingly, the output terminal Q1 of the D-type FF circuit 120 maintains the "L" state until the signal of the clock terminal CLOCK 1 reaches a falling edge.

When the output terminal Q1 of the D-type FF circuit 120 is maintained as "L", the base voltage of the transistor Q1 is equal to or lower than the operation voltage, the transistor Q1 does not operate, electric current does not flow in the relay coil 115A, and both of the two fluorescent lamps 112A and 112B are turned on while the relay contact point 115 remains OFF.

In the D-type FF circuit 120, data of a data input DATA 1 is read into the D-type FF circuit 120 at the falling edge of the clock signal, and the data is output to the output terminal Q1 at the time of the next rising edge of the clock signal.

When input signals of a set terminal SET 1 and a reset terminal RESET 1 of the D-type FF circuit 120 are set to "H", the setting and resetting of the D-type FF circuit 120 can be performed independently from the input of the clock signal. Accordingly, the reset terminal RESET 1 is connected to the collector of the transistor Q3.

When a voltage is applied to the smoothing circuit 121, capacitors C6 and C7 are charged, the capacitors C6 and C7 are discharged after the application of the voltage is stopped, and the D-type FF circuit 120 maintains the operation state until the discharge continues to reach a predetermined voltage or lower. The discharge time is determined by the capacitors C6 and C7 and the circuit resistance.

When the power supply switch is turned on again while the capacitors C6 and C7 are continuously discharged down to a predetermined voltage (0.2 to 2.5 seconds in FIG. 8), as shown in FIG. 5, the clock signal output from the collector of the transistor Q2 is transmitted to the clock terminal CLOCK 1 of the D-type FF circuit 120, the output terminal Q1 of the D-type FF circuit 120 becomes "H", the reverse terminal –Q1 becomes "L", and the states are maintained.

In this case, the base voltage of the transistor Q1 becomes the operation voltage, the transistor Q1 operates, electric current flows into the relay coil 115A, and the relay contact point 15 is turned on. Accordingly, the fluorescent lamp 112B close to the light turning-off circuit 113B is turned on, but the light turning-off circuit 113A connected to the switching switch 116 electrically connects both terminals of the fluorescent lamp 112A with a resistance determined by two inductors 125, and thus the fluorescent lamp 112A is not turned on.

After one lamp is turned off, when the switch is turned on again while the capacitors C6 and C7 are continuously discharged (0.2 to 2.5 seconds in FIG. 8) down to a predetermined voltage by turning off the power supply, the clock signal output from the collector of the transistor Q2 is transmitted to the clock terminal CLOCK 1 of the D-type FF circuit 120, the output terminal Q1 of the D-type FF circuit 120 becomes "L", the inverse terminal –Q1 becomes "H", and the states are maintained.

In this case, the base voltage of the transistor Q1 is equal to or lower than the operation voltage, the transistor Q1 does not operate, no current flows in the relay coil 115A, the relay contact point 115 is turned off, and thus both of the two fluorescent lamps 112A and 112B are turned on.

Meanwhile, when the power supply switch is turned off and the capacitors C6 and C7 are discharged down to a predetermined voltage or lower, the D-type FF circuit 120 is initialized and the relay coil 115A is in a state where no current flows in the relay coil 115A. Accordingly, the relay contact point 115 returns to the OFF state, and the fluorescent lamps 112A and 112B return to the state where they can be turned on.

As described above, when the ON/OFF operation of the power supply switch is repeated, the D-type FF circuit 120 is also flip-flopped. Accordingly, it is possible to control and maintain the relay contact point 115, and thus the 2-lamp lighting and the 1-lamp lighting can be switched and operated.

The fluorescent lamps 112A and 112B turned off at the time of the 1-lamp lighting can be switched by the switching operation of the switching switch 116.

Figure 9:
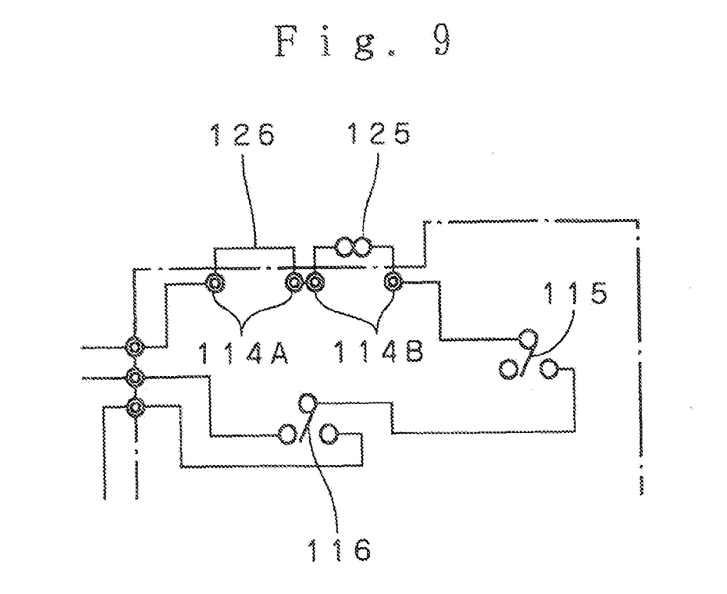
FIG. 9 is a diagram illustrating a modified example of the embodiment.

When the characteristics of the fluorescent lamp appliances are different from one another, as shown in FIG. 9, the resistances according to the characteristics of the fluorescent lamp fixtures are applied to the turning-off circuits 113A and 113B by connecting the conductor 126 and the inductor 125 to the connection terminals 114A and 114B, and thus it is possible to secure the operations of the 2-lamp lighting and the 1-lamp lighting of the fluorescent lamp appliances.

The power supply input of the first control circuit 117 is connected to the normally closed-type relay contact point 130, and the relay contact point 130 is opened or closed by the second control circuit 131. The second control circuit 131 employs the same configuration as that of the second control circuit 20 of the first embodiment, and opens and closes the relay contact point 130 by the instruction signal of the PC (not shown).

Accordingly, the 2-lamp lighting and the 1-lamp lighting of the fluorescent lamp fixture can be switched by a PC, and thus it is possible to exert fine control of performing the 2-lamp lighting at a desired place and a desired time and switching to the 1-lamp lighting at other places and times.

In the example, the first control circuit 117 and the relay contact point 115 are mounted on the board 118, the board 118 and the second control circuit 130 are built in the same case, and the board 118 is provided with the connection terminals 114A and 114B to be exposed from the case. However, the second control circuit 130 may be mounted on the board 118, and the board 118, on which the first control circuit 117 and the relay contact point 115 are mounted, and the second control circuit 130 may be built in the built-in case of the inverter-type stabilizer 110.

REFERENCE SIGNS LIST

10: POWER SUPPLY CIRCUIT
11: COMMERCIAL POWER SUPPLY
12: POWER SUPPLY SWITCH
13: INVERTER-TYPE STABILIZER
14A, 14B: CURRENT-CARRYING CIRCUIT
16A, 16B: FLUORESCENT LAMP
18: RELAY CONTACT POINT (FLUORESCENT LAMP SWITCHING MEANS)
19: FIRST CONTROL CIRCUIT
20: SECOND CONTROL CIRCUIT
SW: SWITCH (SWITCH MEANS)
30: CLOCK GENERATING CIRCUIT
31: CHARGE/DISCHARGE CIRCUIT
32: SWITCHING CIRCUIT
IC2: D-TYPE FLIP-FLOP CIRCUIT
RY: RELAY
110: INVERTER-TYPE STABILIZER
111A, 111B: CURRENT-CARRYING CIRCUIT
112A, 112B: FLUORESCENT LAMP
113A, 113B: LIGHT TURNING-OFF CIRCUIT
114A, 114B: CONNECTION TERMINAL
115: RELAY CONTACT POINT
115A: RELAY COIL
116: SWITCHING SWITCH
117: FIRST CONTROL CIRCUIT
118: BOARD
120: D-TYPE FLIP-FLOP CIRCUIT
121: RECTIFIER CIRCUIT
122: CLOCK CIRCUIT
123: CHARGE/DISCHARGE CIRCUIT
124: SWITCHING CIRCUIT
130: NORMALLY CLOSED RELAY CONTACT POINT
131: SECOND CONTROL CIRCUIT

The invention claimed is:

1. A 2-lamp parallel-type fluorescent lamp appliance in which two current-carrying circuits are connected to output terminals of a stabilizer using a commercial power supply as a power supply in series to the output terminals and are connected in parallel to each other, fluorescent lamps are connected to each of the two current-carrying circuits, the stabilizer is electrically connected to the current-carrying circuits by an ON/OFF operation of a power supply switch thereby two fluorescent lamps are turned on, the fluorescent lamp appliance comprising:
   a fluorescent lamp switching means that is provided at one of the two current-carrying circuits and connects or disconnects the one current-carrying circuit;
   a first control circuit that operates according to the ON/OFF operation of the power supply switch, is electrically connected by the ON operation of the power supply switch within a predetermined time after the power supply switch is turned on and then is turned off, and controls the fluorescent lamp switching means to disconnect the current-carrying circuit; and
   a second control circuit that opens a normally closed relay contact point when the relay contact point is connected to a power supply input terminal of the first control circuit and is electrically connected to a relay coil by receiving an external instruction signal, and disconnects the one current-carrying circuit by controlling the first control circuit when the relay contact point is closed within a predetermined time after it is opened at the time of the ON operation of the power supply switch.

2. The fluorescent lamp appliance according to claim 1, wherein the fluorescent lamp switching means is formed of a normally closed-type relay contact point,
   wherein the first control circuit includes
   a switch means that is turned on or off according to the ON/OFF operation of the power supply switch,
   a clock generating circuit that generates a clock signal when the switch means is turned on;
   a D-type flip-flop circuit that inverts a state of output signal by an input of a clock signal;
   a charge/discharge circuit that is charged by applying a circuit voltage, and maintains an operation state of the D-type flip-flop circuit during discharge after the switch means is turned off; and
   a switching circuit that is provided with a relay coil therein, and turns on or off the relay contact point of the fluorescent lamp switching means according to the output signal of the D-type flip-flop circuit.

3. A 2-lamp serial-type fluorescent lamp appliance in which two current-carrying circuits are connected to output terminals of a stabilizer using a commercial power supply as a power supply in series to the output terminals and are connected in series to each other, fluorescent lamps are connected to each of the two current-carrying circuits, the stabilizer is connected to the current-carrying circuits by an ON/OFF operation of a power supply switch, and two fluorescent lamps are turned on, the fluorescent lamp appliance comprising:

light turning-off circuits that are provided with an inductor with a selected resistance connected in series, and turn off one fluorescent lamp by electrically connecting both terminals of one fluorescent lamp of the two fluorescent lamps; and a first control circuit that operates according to the ON/OFF operation of the power supply switch, and closes the light turning-off circuits when the power supply switch is turned on to flow electric current within a predetermined time after the power supply switch is turned on and then is turned off.

4. The fluorescent lamp fixture according to claim 3, wherein the first control circuit includes a relay contact point that closes the light turning-off circuits by electrical connection to a relay coil, a clock generating circuit that generates a clock signal when the power supply switch is turned on, a D-type flip-flop circuit that inverts an output signal by an input of the clock signal, a charge/discharge circuit that is charged by applying a circuit voltage, and maintains an operation state of the D-type flip-flop circuit during discharge after the power supply switch is turned off, and a switching circuit that allows current to flow in the relay coil according to an output signal of the D-type flip-flop circuit.

5. The fluorescent lamp fixture according to claim 3, further comprising a second control circuit that opens a normally closed relay contact point when the relay contact point is connected to a power supply input of the first control circuit and is electrically connected a relay coil by receiving an external instruction signal, and electrically connects the light turning-off circuits by controlling the first control circuit when the relay contact point is closed within a predetermined time after it is opened at the time of the ON operation of the power supply switch.

6. The fluorescent lamp appliance according to claim 3, wherein connection terminals of an inductor are provided to serially and exchangeably connect the inductor to the light turning-off circuits.

7. The fluorescent lamp appliance according to claim 1, wherein the external instruction signal is a signal output from a control device operated by a program.

8. A lighting control apparatus of a fluorescent lamp appliance, the apparatus comprising:

a stabilizer in a 2-lamp parallel-type fluorescent lamp fixture in which two current-carrying circuits are connected to output terminals of the stabilizer using a commercial power supply as a power supply in series to the output terminals and are connected in parallel to each other, fluorescent lamps are connected to each of the two current-carrying circuits, the stabilizer is connected to the current-carrying circuits by an ON/OFF operation of a power supply switch, and two fluorescent lamps are turned on;

a first control circuit that operates according to the ON/OFF operation of the power supply switch, is electrically connected by the ON operation of the power supply switch within a predetermined time after the power supply switch is turned on and is then turned off, and controls the fluorescent lamp switching means to disconnect the current-carrying circuit; and a second control circuit that opens a normally closed relay contact point when the relay contact point is connected to a power supply input of the first control circuit and is electrically connected to a relay coil by receiving an external instruction signal, and disconnects the one current-carrying circuit by controlling the first control circuit when the relay contact point is closed within a predetermined time after it is opened at the time of the ON operation of the power supply switch, wherein the stabilizer, the first control circuit, and the second control circuit are provided in a same case or are mounted on a same board.

9. A lighting control apparatus used in a 2-lamp parallel-type fluorescent lamp appliance in which two current-carrying circuits are connected to output terminals of a stabilizer using a commercial power supply as a power supply in series to the output terminals and are connected in parallel to each other, fluorescent lamps are connected to the two current-carrying circuits, the stabilizer is connected to the current-carrying circuits by an ON/OFF operation of a power supply switch, and two fluorescent lamps are turned on, the apparatus comprising:

a first control circuit that operates according to the ON/OFF operation of the power supply switch, is electrically connected by the ON operation of the power supply switch within a predetermined time after the power supply switch is turned on and is then turned off, and controls the fluorescent lamp switching means to disconnect the current-carrying circuit; and a second control circuit that opens a normally closed relay contact point when the relay contact point is connected to a power supply input of the first control circuit and is electrically connected to a relay coil by receiving an external instruction signal, and disconnects the one current-carrying circuit by controlling the first control circuit when the relay contact point is closed within a predetermined time after it is opened at the time of the ON operation of the power supply switch, wherein the first control circuit and the second control circuit are provided in the a case or are mounted on a same board.

10. A lighting control apparatus of a fluorescent lamp appliance, the apparatus comprising:

a stabilizer in a 2-lamp parallel-type fluorescent lamp fixture in which two current-carrying circuits are connected to output terminals of the stabilizer using a commercial power supply as a power supply in series to the output terminals and in series to each other, fluorescent lamps are connected to the two current-carrying circuits, the stabilizer is electrically connected to the current-carrying circuits by an ON/OFF operation of a power supply switch, and two fluorescent lamps are turned on; and a first control circuit that operates according to the ON/OFF operation of the power supply switch, closes light turning-off circuits when the power supply switch is turned on to flow electric current within a predetermined time after the power supply switch is turned on and then is turned off, and turns off one fluorescent lamp by electrically connecting both terminals of one fluorescent lamp of the two fluorescent lamps, wherein the stabilizer and the first control circuit are provided in the a case or are mounted on a same board, and wherein the case or the board is provided with connection terminals, and an inductor, with a resistance selected according to an output characteristic of the stabilizer, constituting the light turning circuits is exchangeably connected to the connection terminals.

11. A lighting control apparatus used in a 2-lamp serial-type fluorescent lamp appliance in which two current-carrying circuits are connected to output terminals of a stabilizer using a commercial power supply as a power supply in series to the output terminals and in series to each other, fluorescent lamps are connected to the two current-carrying circuits, the stabilizer is connected to the current-carrying circuits by an ON/OFF operation of a power supply switch, and two fluorescent lamps are turned on, the apparatus comprising:
  a first control circuit that operates according to the ON/OFF operation of the power supply switch, closes light turning-off circuits when the power supply switch is turned on to flow electric current within a predetermined time after the power supply switch is turned on and then is turned off, and turns off one fluorescent lamp by electrically connecting both terminals of one fluorescent lamp of the two fluorescent lamps,
  wherein the first control circuit is provided in a case or are mounted on a board, and
  wherein the case or the board is provided with connection terminals, and an inductor, with a resistance selected according to an output characteristic of the stabilizer, constituting the light turning-off circuits is exchangeably connected to the connection terminals.

12. The lighting control apparatus of the fluorescent lamp appliance according to claim 10, further comprising a second control circuit that opens a normally closed relay contact point when the relay contact point is connected to a power supply input of the first control circuit and is electrically connected to a relay coil by receiving an external instruction signal, and closes the light turning-off circuits by controlling the first control circuit when the relay contact point is closed within a predetermined time after it is opened at the time of the ON operation of the power supply switch,
  wherein the second control circuit is provided in the case or is mounted on the board.

13. The fluorescent lamp appliance according to claim 5, wherein the external instruction signal is a signal output from a control device operated by a program.

14. The lighting control apparatus of the fluorescent lamp appliance according to claim 11, further comprising a second control circuit that opens a normally closed relay contact point when the relay contact point is connected to a power supply input of the first control circuit and is electrically connected to a relay coil by receiving an external instruction signal, and closes the light turning-off circuits by controlling the first control circuit when the relay contact point is closed within a predetermined time after it is opened at the time of the ON operation of the power supply switch,
  wherein the second control circuit is provided in the case or is mounted on the board.

* * * * *